Oct. 23, 1956  W. H. DARLING  2,767,735
VALVE DEVICE
Filed Oct. 24, 1951

WILLIAM H. DARLING,
INVENTOR.

BY George V. Smyth

ATTORNEY.

United States Patent Office 2,767,735
Patented Oct. 23, 1956

2,767,735
VALVE DEVICE

William H. Darling, Alhambra, Calif., assignor to Dumont Aircraft Fitting Company, Long Beach, Calif.

Application October 24, 1951, Serial No. 252,851

9 Claims. (Cl. 137—527)

This invention relates to valve assemblies and more particularly to a check valve assembly having a selectively variable closing means.

In many uses of check valves today and particularly in the aircraft industry, valve assemblies are required which are capable of selected adjustment as regards the closing means used. In prior check valves of the type and kind herein shown a spring means has been generally used to normally urge a movable valve element against its seat or at least to some desired position relative to its seat.

These spring means have been extremely difficult to maintain uniform in production and consequently a considerable variance has been had in prior valve assemblies. To obviate this variance, extreme care had to be taken to secure substantially uniform springs and each valve structure carefully tested to eliminate valves which were not within workable tolerances for the installation contemplated.

In the valve assembly of the present invention, the movable valve element thereof is held in some desired position relative to a seat or the like by means of a torsion spring, the thrust or force of which can be selectively varied. Thus, no particular care is required in the production of the springs for the thrust of the spring of each assembly can be selectively adjusted to produce the action desired on the movable valve element. This eliminates the inconstant or variable action of the previously proposed valve assemblies.

The torsion spring of the present assembly is in the form of a coil sleeving a normally fixed pin or the like forming a pivot axis of the movable valve element. The one end of the spring is fixed to this pin while the opposite end acts against the movable valve element to normally urge the same to some desired position relative to the seat of the assembly.

In some embodiments of the present invention, the end of the spring opposite to the end fixed to the pin, seats against a fixed abutment forming a part of the mounting means of the movable valve element and the spring tends to urge the pin longitudinally to hold the end thereof adjacent the connection to the spring in position within a socket or like member. The wall of this socket is formed with means inter-engaging with means carried by the end of the pin disposed within the socket which coact to hold the pin against rotation. As the pin is held against rotational movement the spring obviously will resist pivotal movement of the valve element in one direction of movement away from some normal position established by the action of the spring against the valve element.

As the pin may be moved longitudinally against the action of the spring, the end of the pin normally held in the socket may be retracted from the socket after which the pin may be rotated in one direction or the other to vary the torsional force exerted by the spring, which obviously will vary the loading on the valve element after which the end of the pin may be again moved into the socket. Once the desired adjustment has been made and the end of the pin again received within the socket, the inter-engaging means previously mentioned holds the pin against rotation and maintains constant the spring force at the preselected position of adjustment.

In other embodiments of the present invention, the one end of the pin is formed with external threads adapted to engage with threads formed internally of the socket. In this form of the valve device of the present invention, the pin is normally held against accidental rotation but is selectively rotatable to vary the torsional force exerted by the spring. Once the pin has been rotated to vary the reaction force of the spring against the pivotally mounted valve element, the pin is held against rotation to maintain the desired action of the spring against the valve element.

Other features and advantages of the present invention will be hereinafter apparent from the following description, particularly when taken in connection with the accompanying drawing, in which.

Figure 4:
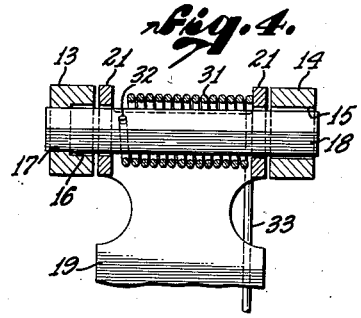
Figure 4 is a section taken along line 4—4 of Figure 3.
Figure 3:
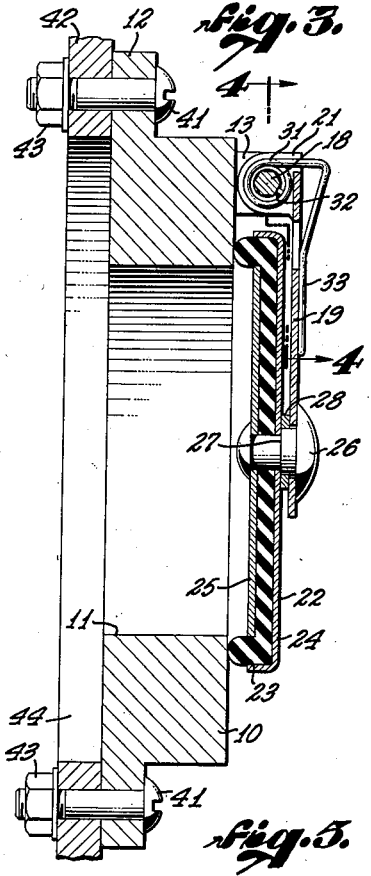
Figure 3 is a section taken along line 3—3 of Figure 2.
Figure 5:
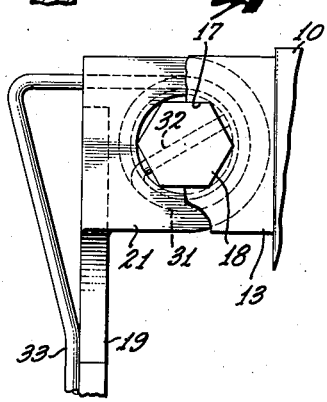
Figure 5 is an end view of a fragmentary portion of the valve.

The valve assembly of the present invention, as best seen in Figure 3 of the drawing, comprises a body member 10 having a bore 11 extending therethrough. The body member 10 is formed with an annular flange 12 which, as will be hereinafter shown, forms the mounting means for the body member 10. Carried by the one face of the body member is a pair of spaced lugs 13 and 14 which are preferably formed integral with the body member. In the form of the invention shown in Figures 1 through 5, the lug 14 is formed with a bore extending therethrough defining a cylindrical wall surface 15. The lug 13 is formed with a bore 16 defining a cylindrical surface which bore is reduced, as shown at 17 in Figures 4 and 5, and formed of a cross-sectional shape hexagonal in form. A bar or pin 18 of a length just slightly greater than the distance between the oppositely facing surfaces of the lugs 13 and 14 is adapted to pivotally mount an arm 19 between the lugs 13 and 14. This arm 19 is formed with a pair of laterally extending fingers 21 formed with centrally located, aligned openings for passing the pin 18.

The one end of the arm 19 is fixed to the movable valve element 22, referring again to Figure 3, which comprises a dish-shaped element 23 circular in cross-section and formed of some suitable resilient material such as rubber or rubber-like composition. This element concentrically seats within a rigid dish-shaped element 24 and is held therein by a rigid disc 25 after a shouldered rivet 26, fixing the element 22 to the arm 19, is upset. It will be seen that the shank of the rivet is formed with a shoulder 27 which engages the exposed face of the rigid, dish-shaped member 24 so that this member 24 is tightly held against the shoulder when the rivet is upset. If desired, a washer 28 may be interposed between the arm 19 and the exposed face of the dish-shaped member 24.

The free edges of the cylindrical wall of the dish-shaped member 23 are formed semi-cylindrical in cross-section, as clearly shown in Figure 3, and this peripheral edge of the dish-shaped member 23 is adapted to engage and seat against an annular planar portion of the one face of the body member to seal the orifice formed by the one end of the bore 11.

The valve element 22 is normally held in a desired position relative to the seat by means of a coiled spring 31 which sleeves the pin 18. This spring has one end laterally formed into a finger-like extremity 32 which is passed through a somewhat transversely extending bore formed through the pin 18. The opposite end coil of the spring seats against the ear 21 adjacent the lug 24 and this coil is formed with a finger 33 which bears against the arm 19 and urges the same in a clockwise direction as viewed in Figure 3. As the coil spring 31 seats against the one ear 21 and is loaded in compression, the spring 31 through the finger 32 will exert a force on the pin 18 longitudinally to the left, as viewed in Figure 4. This movement of the pin, however, is limited by the other ear 21 arranged adjacent the lug 13. This action of the spring, it should now be seen, tends to hold the leftward end of the pin 18 engaged in the reduced portion of the bore 16. As this reduced bore 17 has a cross-sectional shape in the form of a hexagonal, the pin 18 can be held against rotation by forming at least the end of the pin engaged in the reduced bore 17 of a hexagonal cross-sectional shape substantially equal to the hexagonal cross-sectional shape of the reduced bore 17.

It will thus be seen that so long as the leftward end of the pin 18 is engaged in the socket formed by the reduced bore 17, the pin 18 is held against rotational movement and the reaction force of the spring 31 serves to hold the end of the pin engaged in the socket while at the same time resisting counter-clockwise movement of the arm 19 and the valve element 22 carried thereby.

Figure 1:
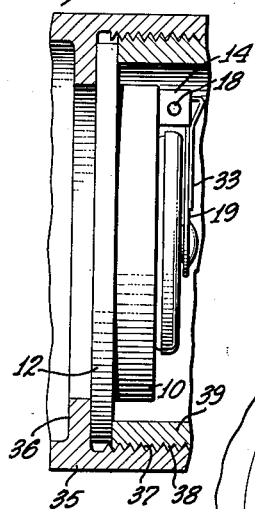
Figure 1 is a view partly in section and partly in elevation of a valve of the present invention in one use thereof.

A valve such as the embodiment just described has many uses, one of which is illustrated in Figure 1 of the drawing. In this use of the valve assembly of the present invention, the valve is mounted within a conduit or like means 35 having a radially extending flange 36 defining an opening having a diameter less than the diameter of the mounting flange 12 of the body member 10. The conduit 35 is internally threaded as indicated at 37 and these internal threads engage with external threads 38 of a ring or sleeve 39 engaging the mounting flange 12 and holding the same against the one face of the flange 36 of the conduit 35. In this use of the valve assembly of the present invention, fluid may pass to the right as viewed in Figure 1 through the bore of the valve body so long as the pressure of the fluid exceeds the force exerted by the spring 31 against the arm 19 and the valve element 22 carried thereby. Flow of the fluid to the left, as viewed in Figure 1, would thus be checked by the valve for the movable element would immediately seat against the valve body 10 and close the bore 11.

Figure 2:
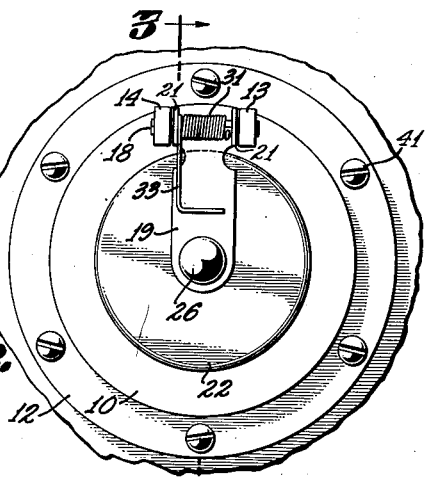
Figure 2 is a front elevational view of the valve in another use thereof.

In the use of the valve of the present invention shown in Figures 2 and 3, the flange 12 is formed with a plurality of spaced openings for passing bolts 41 or like securing elements, the ends of which extend through openings formed in a wall 42 for receiving the nuts indicated at 43. In this use of the valve of the present invention wherein the wall 42 defines a part of some enclosure, fluid may pass outwardly of the container through an opening 44 formed in the wall 42 and concentrically arranged relative to the bore 11 so long as the pressure within the enclosure exceeded the reaction force of the spring 31 acting against the arm 19 and the movable element 22 carried thereby.

In whatever use the valve of the present invention is put it is often desirable to have some means for varying the reaction force of the spring exerted against the movable valve element. The present invention provides such a means, for although the pin 18 is held against rotational movement so long as the one end therof is engaged in the socket formed by the reduced bore 17, the pin is free to move longitudinally against the action of the spring 31 to free the end of the pin from the socket formed by the reduced bore 17. Once this end of the spring is freed from the socket, the pin may be rotated in one direction or the other to vary the torsional force of the spring after which the pin is returned to its position in which the one end is held within the socket formed by the reduced bore 17.

This, as should now be understood, holds the pin against rotation. It should be obvious now that rotation of the pin will vary the torsional effect of the spring acting against the arm 19 and consequently the pressure necessary to move the movable valve element from its seat formed by the one face of the body member 10. This adjustment is very easily brought about for, as above explained, it is merely necessary to slide the pin 18 to the right, as viewed in Figure 4, a distance sufficient to free the leftward end of the pin from the socket 17, after which the pin may be rotated to bring out the desired adjustment.

Figure 8:
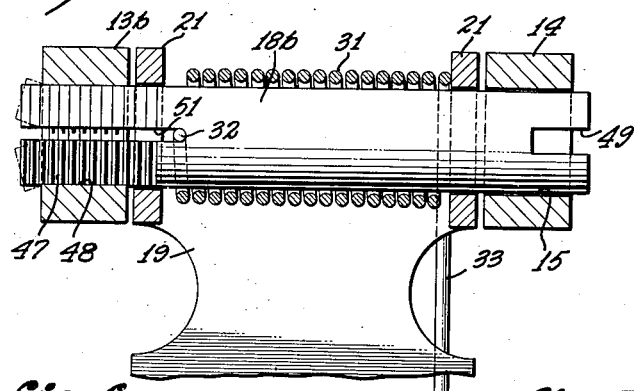
Figure 8 is a sectional view of a further modified form of the valve.
Figures 6, 7:
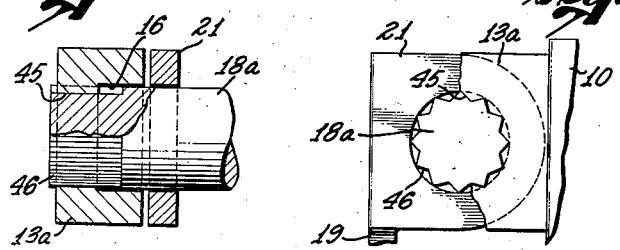
Figure 6 is a sectional view of a fragmentary portion of a modified form of the valve.
Figure 7 is an elevational view of the fragmentary portion of the modified form of the valve shown in Figure 6.

In the form of the invention shown in Figures 6 and 7, the bore 16 of the lug 13a is reduced and the wall of the reduced portion of this bore is formed, as best seen in Figure 7, with a plurality of equally spaced longitudinally extending serrations 45. The end of the pin 18 normally held in the reduced portion of the bore is also formed with matching serrations or ribs 46 which, when engaged with the serrations 45, serve to hold the pin against rotational movement in either direction. This type of pin would be used in installations where a finer adjustment is required than would be possible with the hexagonal pin of the previously described embodiment of the invention.

Where extremely fine adjustments are required, referring now to Figure 8, a pin of circular cross-sectional shape can be used and the end of the pin engaged in the bore of the lug 13b be formed with screw threads as indicated at 47. These threads would engage with threads 48 formed internally of the lug 13b. It will be seen that in this embodiment of the invention any rotation of the pin 18b will vary the torsional action of the spring as exerted against the arm carrying the movable element of the valve assembly. To facilitate rotation of the pin, a small tool engaging kerf or the like is preferably formed in the end face opposite the threads 47. This kerf is indicated at 49 in Figure 8.

To prevent accidental rotation of the pin 18b once the same has been rotated to bring about the desired adjustment of the spring, some means are employed for locking the pin 18b against rotation. Although this means may comprise any means desired, in the now preferred embodiment of the present invention, the pin 18b is formed with a diametrically extending slot 51 extending inwardly at the end engaged with the lug 13b.

Once the pin 18b is rotated to bring about the desired adjustment, a small wedge shaped element could be forcibly inserted within the open end of the slot 51 to swage outwardly the portion of the pin 18b extending beyond the outer face of the lug 13b. Once this end of the pin was swaged outwardly to form a non-circular configuration thereon, as shown in the broken line illustration of Figure 8, the pin 18b would be securely held against rotation so that the reaction force of the spring could be maintained to exert the desired thrust against the arm carrying the movable element of the valve assembly.

To simplify assembly of this embodiment of the valve structure of the present invention, the slot 51 can be made of such a length as to extend inwardly of the ear 21 adjacent the lug 13b to permit the finger 32 of the spring 31 to be passed through this slot to anchor the spring to the pin. This eliminates the tedious operation of inserting the finger 32 into the transversely extending bore of the earlier described embodiment of the present invention.

It should be seen now that in all embodiments of the present invention herein shown, means are provided for varying the torsional action of the spring exerted against the movable element of the valve assembly so that a preselected loading of the movable element can be had and which will be held uniform under exact design conditions. This adjustment is made without rendering complicated the valve assembly and the valve assembly is so made that very accurate adjustments can be had.

In all forms of the invention, a noncircular portion of the pivot pin engages a noncircular pivot passage to hold the pivot pin against rotation at a selected rotary position. In this regard, it is to be noted with reference to Figure 8, that any screw-threaded member is noncircular in cross section since any transverse section thereof perpendicular to the axis will be out of round. Thus in Figure 8, both the threaded passage in the lug 13b and the threaded portion of the pivot pin 18b are noncircular in cross sectional configuration. The particular noncircular portion of the pivot pin 18b that engages the lug 13b is the deformed outer end portion of the pivot pin that is indicated by the dotted lines.

To make another approach to the invention, it is to be noted that in all of the forms shown in the drawing, a shoulder of the pivot pin is in adjustable engagement with a cooperating shoulder of the pivot passage means to hold the pivot pin against rotation in an adjustable manner. Thus in the form of the invention shown in Figures 4 and 5 the hexagonal configurations of the pivot pin and the passage means provide the cooperating shoulders. Again in Figures 6 and 7, the serrations of the pivot pin and of the pivot passage means provides the cooperating shoulders.

In the form of the invention shown in Figure 8, the shoulder of the pivot pin that adjustably engages the shoulder of the passage means is the deformed outer end portion of the pivot pin shown in dotted lines. What portion of the lug 13b serves as a shoulder to cooperate with the deformed shoulder depends upon the radial extent of the deformation of the end portion of the pivot pin. If the end portion of the pivot pin is greatly deformed radially outwardly, the deformed shoulder will abut the outer end face of the lug 13b to hold the pivot pin against rotation and the outer end face will constitute the cooperating shoulder. On the other hand, if the end portion of the pivot pin in Figure 8 is deformed radially to a lesser extent, it will wedge into engagement with an inner shoulder of the lug, the inner shoulder being a portion of the inner screw thread of the lug.

In all instances, the pivot member is moved longitudinally for disengagement of the two shoulders to permit adjustment of the pivot pin with respect to the degree of biasing of the valve member. In the form of the invention shown in Figures 4 and 5 and again in the form of the invention shown in Figures 6 and 7, the retraction movement of the pivot pin is simple longitudinal movement. In Figure 8 the retraction of the pivot pin to permit adjustment with respect to the engagement of the cooperating shoulders is helically longitudinal.

Although the now preferred embodiments of the present invention have been shown and described herein, it is to be understood that the invention is not to be limited thereto, for it is susceptible to changes in form and detail within the scope of the appended claims.

I claim:

1. Means to mount a valve member on a valve body with selective bias relative to the valve body, said means comprising: a pivot member; means on said valve member to rotatably embrace said pivot member intermediate its ends to support the valve member for swinging movement relative to said valve body; a coiled spring to surround said pivot member with one end of the spring engaging the pivot member and the other end contacting said valve member to bias the valve member relative to said valve body whereby the bias of the valve member will vary with axial rotation of the pivot member; and passage means of noncircular cross-sectional configuration on said valve body integral therewith to embrace said pivot member at various rotary positions thereof for selectively biasing the valve member, said pivot member being longitudinally movable in said integral means on the valve body and having a noncircular portion coacting with said last named means to hold the pivot member selectively against rotation by noncircular engagement with the said means on the valve body, said noncircular portion of the pivot member being disengageable from said embracing means by longitudinal movement of the pivot member to allow rotary adjustment of the pivot member.

2. A valve device of the character described, comprising: a valve body providing a pivot passage, at least a portion of said pivot passage being noncircular in cross-sectional configuration; a pivot member extending into said pivot passage, said pivot member having a portion of non-circular cross sectional configuration; a valve member having a pivot aperture rotatably embracing said pivot member for swinging movement of the valve member relative to said valve body, said pivot member being longitudinally movable in said pivot passage; and a coiled spring surrounding said pivot member with one end of the spring engaging the pivot member and the other end engaging said valve member whereby the bias of the valve member relative to said valve body depends on the rotary position of the pivot member in said pivot passage, said portion of said pivot member being in noncircular engagement with said noncircular portion of said passage to fix the bias of the valve member, said noncircular portion of the pivot member being disengageable from said noncircular portion of said pivot passage by longitudinal movement of the pivot member to allow rotary adjustment of the pivot member.

3. A valve device as set forth in claim 2 in which said pivot passage is restricted at one end and one end of said pivot member is in noncircular engagement with the restricted part of the passage.

4. A valve device of the character described comprising: a valve body providing a pivot passage, said passage having a restricted noncircular portion; a pivot member extending into said passage, said pivot member having a noncircular portion engaging said noncircular portion of the passage to fix the rotary position of the pivot member, said pivot member being longitudinally retractable for disengagement of said noncircular portions; and a coiled spring surrounding said pivot member with one end of the spring engaging the pivot member and the other end engaging said valve member to bias the valve member relative to said valve body.

5. A valve device as set forth in claim 4 in which said spring reacts in compression between the valve body and the pivot member to urge the pivot member in the longitudinal direction to hold said noncircular portion of the pivot member in said non-circular portion of the pivot passage.

6. A valve device as set forth in claim 4 in which said non-circular portion of the pivot member is polygonal in cross-section.

7. A valve device as set forth in claim 6 in which said non-circular portion of the pivot member is hexagonal in cross-section.

8. A valve device as set forth in claim 4 in which said non-circular portion of the passage and said portion of the pivot member have complementary longitudinal ribs.

9. A valve device of the character described, comprising: a valve body having a pivot-passage portion, said portion forming a shoulder; a pivot member extending into said pivot-passage portion; a valve member having a pivot aperture rotatably embracing said pivot member for swinging movement of the valve member relative to the valve body; and a coil spring surrounding said pivot member with one end of the spring engaging the pivot member and the other end engaging said valve member whereby the bias of the valve member relative to the valve body depends on the rotary position of the pivot member in said pivot-passage portion, said pivot member having a shoulder in adjustable engagement with said shoulder of the pivot-passage portion of the valve body to hold the pivot member against rotation by said spring, said shoulder being disengageable by movement of said pivot member relative to said body to permit adjustment in the engagement of said shoulders for varying said bias.

References Cited in the file of this patent

UNITED STATES PATENTS

| | | |
|---|---|---|
| 827,823 | Starr | Aug. 7, 1906 |
| 1,280,063 | Miller | Sept. 24, 1918 |
| 1,304,113 | Stanley | May 20, 1919 |
| 2,133,739 | Collins | Oct. 18, 1938 |
| 2,173,973 | Leighton | Sept. 26, 1939 |
| 2,254,261 | Best | Sept. 2, 1941 |
| 2,482,198 | Melichar | Sept. 20, 1949 |
| 2,588,018 | Lauenstein | Mar. 4, 1952 |

FOREIGN PATENTS

| | | |
|---|---|---|
| 11,193 | Great Britain | of 1909 |
| 17,622 | Great Britain | of 1915 |
| 608,072 | Great Britain | of 1948 |